United States Patent [19]
Allen

[11] Patent Number: 4,865,354
[45] Date of Patent: Sep. 12, 1989

[54] CONDUIT COUPLER

[76] Inventor: Jerry L. Allen, 9851 Quail Cove Ct., Sindermere, Fla. 32786

[21] Appl. No.: 349,306

[22] Filed: May 9, 1989

[51] Int. Cl.⁴ ............................................. F16L 35/00
[52] U.S. Cl. ................................... 285/18; 285/110; 285/137.1; 285/345; 285/369; 285/423
[58] Field of Search .................... 285/137.1, 369, 423, 285/417, 345, 18, 110

[56] References Cited

U.S. PATENT DOCUMENTS

| | | | |
|---|---|---|---|
| 3,872,894 | 3/1975 | Streit | 285/137.1 X |
| 4,019,760 | 4/1977 | Streit | 285/137.1 X |
| 4,722,559 | 2/1988 | Bongartz | 285/137.1 X |

Primary Examiner—Dave W. Arola
Attorney, Agent, or Firm—Frederick K. Lacher

[57] ABSTRACT

A conduit coupler (10) for connecting adjacent sections (12,14) of a conduit system having a plurality of inner ducts (16) contained in an outer cylindrical conduit (18). The conduit coupler (10) is a one-piece cylindrical body of resilient rubberlike material with a plurality of spaced sets of circumferentially extending gripper ribs (28) at the outer surface of each end of the coupler (10). Cylindrical chambers (30) for the inner ducts (16) have inner seals extending circumferentially around the surface of the chambers (30) to seal the space between adjacent sections of the inner ducts (32,34).

17 Claims, 3 Drawing Sheets

CONDUIT COUPLER

BACKGROUND OF THE INVENTION

This invention relates generally, as indicated, to conduit systems and especially to multiple duct systems for fiber-optic cables. Heretofore conduit systems have been provided with an outer conduit enclosing a plurality of inner ducts which carry the cables. The outer conduit and inner ducts are assembled from sections around twenty feet (6.01 m) in length. A conduit coupler has been provided which fits inside the outer conduit and contains cylindrical chambers for the ends of the inner ducts. Although this conduit coupler has the slip-fit feature wherein the coupler, outer conduit and inner ducts slide together at the joints, the outer seals make it difficult to install and remove the coupler.

Also the coupler has been made of a number of different parts including separate sealing members at the inner seals and outer seals. This construction has required fabrication of the different parts and then assembly of the parts which is costly and requires inspection of the coupler to make sure it is assembled correctly. The multiple part construction has also limited the positioning of the outer seal to one location and thereby limited the gripping capacity of the outer seal.

SUMMARY OF THE INVENTION

The present invention is directed to a one-piece conduit coupler of resilient rubberlike material which incorporates the necessary inner seals for the inner ducts but provides multiple spaced sets of gripping members on the outer surface of the coupler without sealing so that the force necessary to install and remove the coupler is minimized. The coupler may also be made so that when sections of the outer conduit are pulled apart and the bell end of a section of the conduit is pulled off the coupler, the coupler will remain in engagement with the inner end of an adjacent section of the conduit. There is no problem of manufacturing separate parts of different materials or of assembling the parts correctly to provide the conduit coupler. With the conduit coupler of this invention, not only is the manufacture simplified but the likelihood of faulty assembly is eliminated.

In accordance with an aspect of the invention there is provided a conduit coupler for connecting adjacent sections of a plurality of inner ducts contained in adjacent sections of an outer cylindrical conduit comprising a generally cylindrical one-piece coupler body of resilient rubberlike material having an axis coincident with an axis of the outer cylindrical conduit, an outer wall of the coupler body for positioning inside end portions of the outer cylindrical conduit, gripper ribs extending radially outward from the outer wall for engagement with an inner wall of the outer cylindrical conduit, the gripper ribs extending in a generally circumferential direction around the outer wall for a distance less than the circumference the outer wall to permit flow of air past the gripper ribs during installation and removal of the coupler body from the outer cylindrical conduit, a plurality of spaced axially extending duct supporting cylindrical chambers in the coupler body for positioning the adjacent sections of the inner ducts, and each of the chambers having a sealing wiper rib extending circumferentially around a surface of each of the chambers for engaging an outer surface of each of the adjacent sections of the inner ducts whereby the space between the adjacent sections of each of the inner ducts is sealed to facilitate use of air pressure to blow rope or tape used to pull cables through the inner ducts.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION

Figure 1:
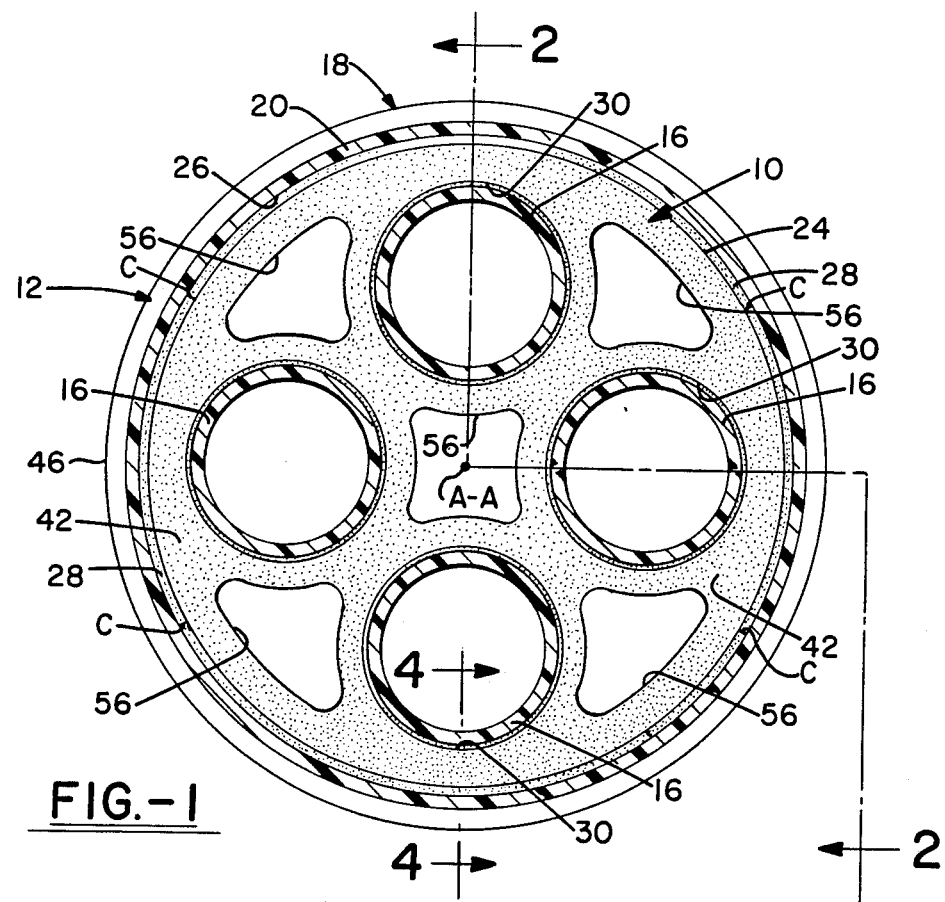
FIG. 1 is an end view of the conduit coupler embodying the invention installed in a conduit system taken along line 1—1 in FIG. 2.
Figure 2:
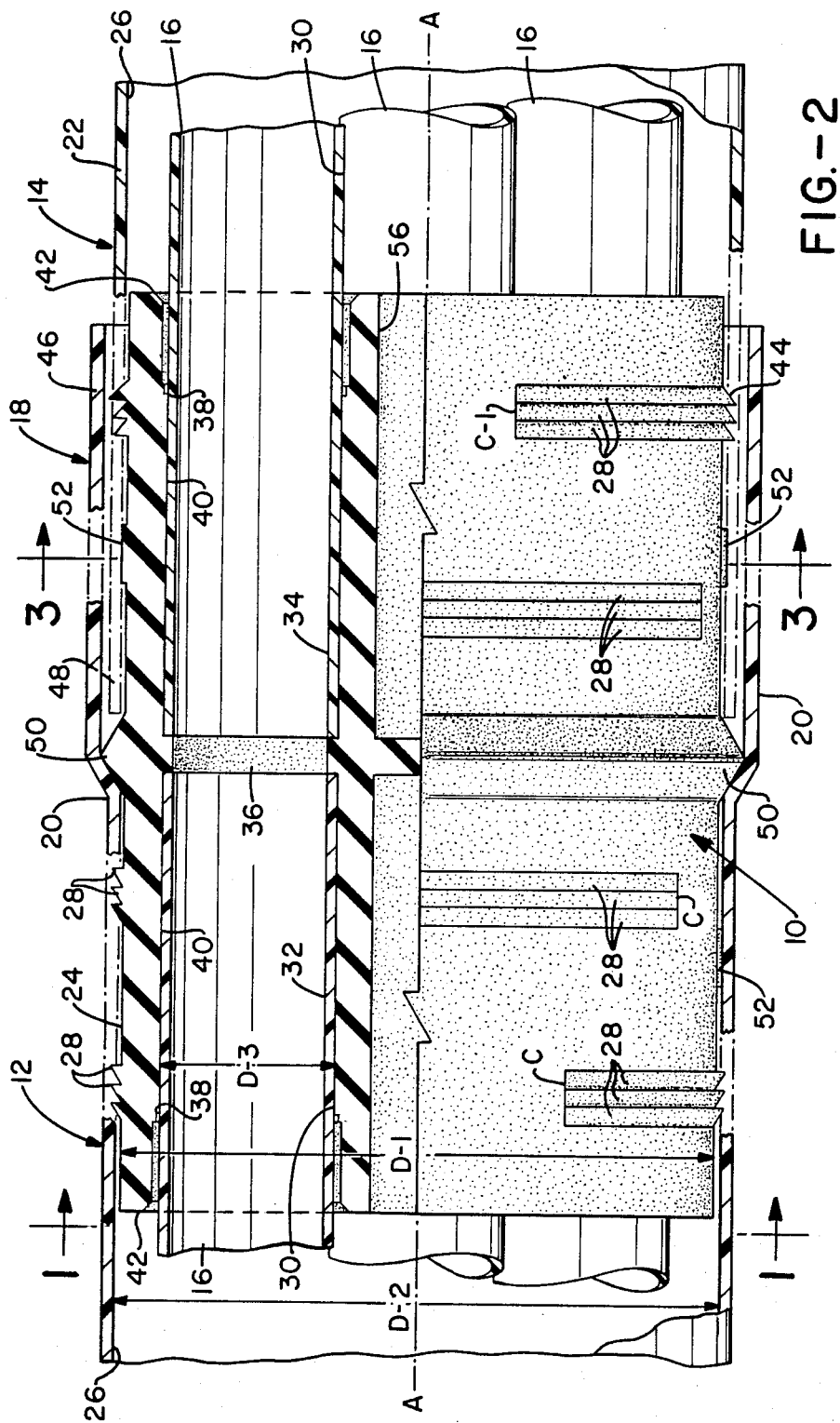
FIG. 2 is a side view partially in section of the conduit coupler shown in FIG. 1, taken along line 2—2 in FIG. 1 with parts of the outer conduit and inner ducts being broken away. Portions of the outer conduit are also shown in dot-dash lines.

Referring to FIGS. 1 and 2, a conduit coupler 10 is shown in position for connecting adjacent sections 12 and 14 of a conduit system enclosing a plurality of inner ducts 16 in an outer cylindrical conduit 18 having adjoining sections 20 and 22.

The conduit coupler 10 is a generally cylindrical one-piece body of resilient rubberlike material such as a thermoplastic elastomeric sold under the name "SANTOPRENE" by Monsanto Chemical Company. The conduit coupler 10 has an outer wall 24 with a diameter D1 less than diameter D2 of an inner wall 26 of the outer cylindrical conduit 18 by a small amount. This permits positioning gripping means such as gripper ribs 28 between the outer wall 24 of the conduit coupler 10 and the inner wall 26 of the outer cylindrical conduit 18. The conduit coupler 10 has an axis A—A which is preferably coincident with the axis of the outer cylindrical conduit 18.

Extending through the body of the conduit coupler 10 are a plurality of spaced, axially extending, duct supporting, cylindrical chambers 30 for supporting adjacent sections 32 and 34 of each of the inner ducts 16. Diameter D3 of the inner walls of the cylindrical chambers 30 is substantially the same as the diameter of each of the inner ducts 16. A center stop rib 36 having a diameter less than the diameter D3 of the inner walls of chambers 30 extends circumferentially around the inner wall of each of the cylindrical chambers at a central position in each of the cylindrical chambers providing a stop to limit the sliding movement of the adjacent sections 32 and 34 of each of the inner ducts 16 into the cylindrical chambers. The center stop rib 36 may have an inner diameter substantially the same as the inner diameter of the inner ducts 16 to provide a continuous wall surface of the inner ducts through the conduit coupler 10.

Figure 4:
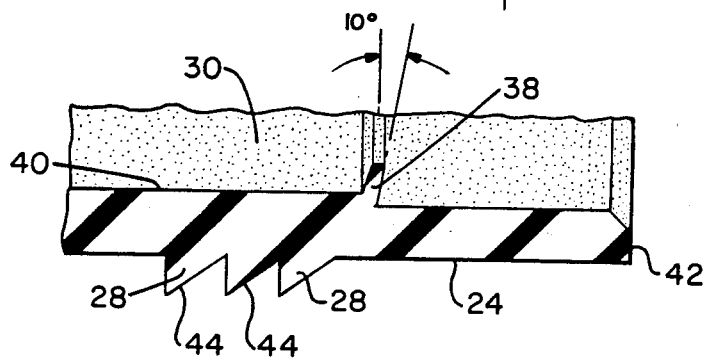
FIG. 4 is an enlarged fragmentary sectional view of the wiper seal taken along line 4—4 in FIG. 1.

As shown in FIGS. 1 and 4, sealing means such as a sealing wiper rib 38 extends circumferentially around an inner wall 40 of each of the cylindrical chambers 30 at a position close to the ends of the conduit coupler 10. The sealing wiper rib 38 may be tapered and inclined toward the end of the conduit coupler 10 at an angle of about ten degrees to a plane perpendicular to the axis A—A of the conduit coupler. The diameter of the inner wall 40 may also be increased between the sealing wiper rib 38 and an end wall 42 of the conduit coupler 10 to facilitate movement of the inner duct 16 into and out of the cylindrical chambers 30. At the same time the space between the adjacent sections 32 and 34 of the inner ducts 16 is sealed so that air pressure can be used to blow rope or tape pulling cables through the inner ducts.

The gripper ribs 28 are molded in the outer wall 24 of the conduit coupler 10 in sets spaced axially and circumferentially of the conduit coupler so that gripping is provided but there is no sealing of spaces between the outer wall 24 of the conduit coupler and the inner wall 26 of the outer cylindrical conduit 18. This facilitates installation and removal of the outer cylindrical sections 20 and 22 from the conduit coupler 10. Each of the sets of gripper ribs 28 may include circumferentially extending ribs in side-by-side relationship with each of the ribs having a sloping side face 44 inclined away from the nearest end wall 42 of the conduit coupler 10.

Figure 3:
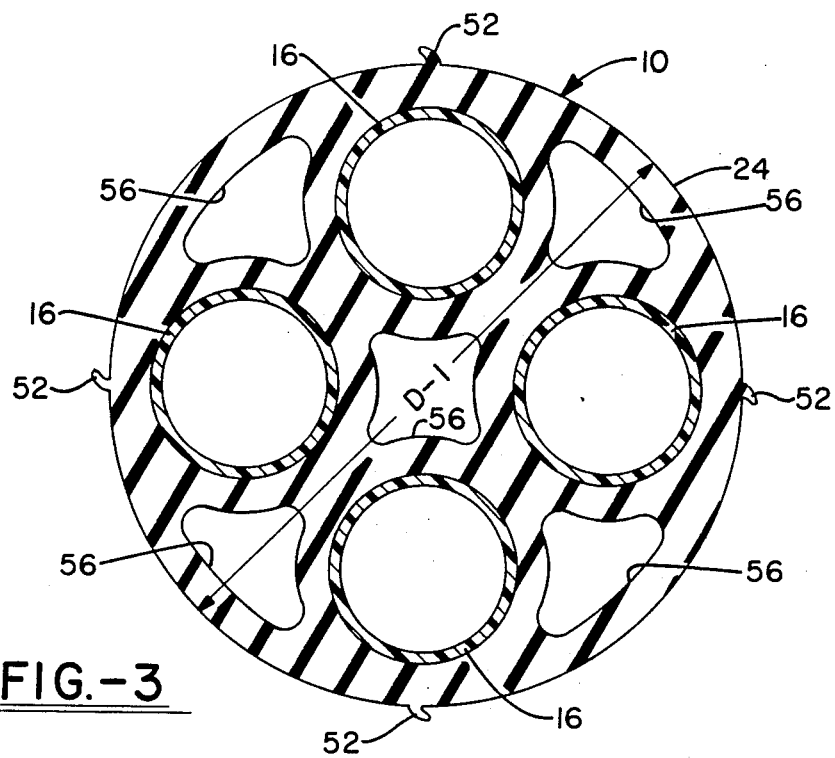
FIG. 3 is a sectional view of the conduit coupler taken along line 3—3 in FIG. 2 with the outer conduit sections deleted.

The outer cylindrical conduit sections 20 and 22 have an enlarged cylindrical portion or bell 46 at one end. In the embodiment of FIG. 2 the bell 46 is on outer cylindrical conduit section 20 and overlaps straight end 48 of the outer cylindrical conduit section 22. An outer stop rib 50 is molded on the outer wall 24 of the conduit coupler 10 at a central portion for engagement by the end of the bell 46 and the straight end 48 of the outer cylindrical conduit sections 20 and 22. Longitudinal, antirotation ribs 52 may also be molded in the outer wall 24 of the coupler, as shown in FIGS. 2 and 3, to resist relative rotation of the outer cylindrical conduit sections 20 and 22.

In some applications, it is desirable that the outer cylindrical section 20 with the bell 46 be pulled off the conduit coupler 10 while the gripper ribs 28 in engagement with the outer cylindrical conduit section 22 hold the conduit coupler 10 in position in the straight end 48 of the outer cylindrical conduit section. This may be accomplished by molding the diameter of the gripper ribs 28 engageable with the outer cylindrical section 22 with a greater diameter than the diameter of the gripper ribs in engagement with the outer cylindrical section 20 as shown in FIG. 2. In addition or alternatively, the lengths of the gripper ribs 28 in engagement with the outer cylindrical conduit section 22 may be longer than the length of the gripper ribs in engagement with the outer cylindrical conduit section 20 as shown in FIG. 2. Preferably the difference in diameter is from about one millimeter to three millimeters (0.04 to 0.12 inches) and the difference in length of the ribs 28 is about a 45 degree arc to obtain this result. As shown in FIG. 1, the gripper ribs 28 in engagement with the outer cylindrical conduit section 20 having ends C extend over an arc of 120 degrees and are separated by spaces extending over an arc of 60 degrees. The gripper ribs 28 in engagement with the outer cylindrical conduit section 22 having ends C-1 extend over an arc of 140 degrees and are separated by spaces extending over an arc of 40 degrees.

Figure 5:
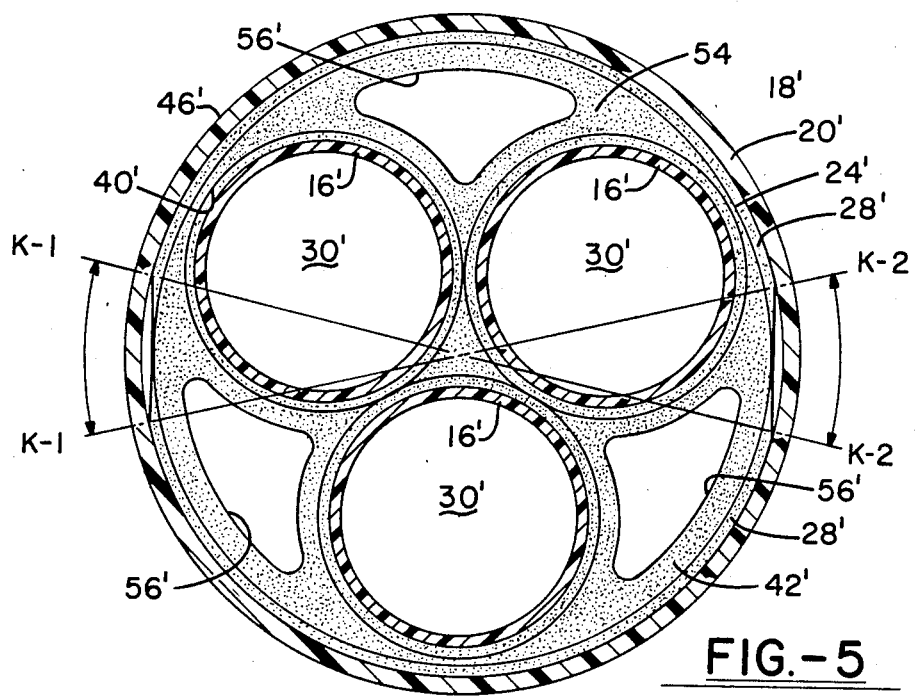
FIG. 5 is an end view like FIG. 1 showing a modified conduit coupler for three inner ducts.

Referring to FIG. 5, a modification is shown in which a conduit coupler 54 is similar to the conduit coupler 10 shown in FIGS. 1 through 4. Where the elements of the system shown are the same, they will be identified with the same numeral with the addition of a prime mark. The conduit coupler 54 is molded of resilient rubberlike material for connecting outer cylindrical sections 20' and 22' of an outer cylindrical conduit 18'. The conduit coupler 54 has three cylindrical chambers 30' instead of the four shown in FIGS. 1 through 4. These chambers 30' are evenly spaced and molded in the same manner as the cylindrical chambers of FIGS. 1 through 4. Gripper ribs 28' are molded around the outer wall 24' of the conduit coupler 54 with each of the ribs extending from end K1 to end K2 over an arc of about 165 degrees and with the space between the ends K1,K1 and K2,K2 extending over an arc of about 15 degrees. With sets of gripper ribs 28' of this length it has been found that antirotation ribs are not necessary. Two sets of the gripper ribs 28' are provided at each side of the center portion with the spaces between the ends K1,K1 and K2,K2 of the ribs being offset 90 degrees.

In both the embodiments of FIGS. 1 and 5, cavities 56 and 56' may be molded in the body of the conduit coupler 10 and 54 to reduce weight and counteract any shrinkage of the material which might distort the shape of the conduit couplers. The conduit couplers 10 and 54 may be injection molded of a rubberlike material such as "SANTOPRENE"

While certain representative embodiments and details have been shown for the purpose of illustrating the invention, it will be apparent to those skilled in the art that various changes and modifications may be made therein without departing from the spirit or scope of the invention.

I claim:

1. A conduit coupler for connecting adjacent sections of a plurality of inner ducts contained in adjacent sections of an outer cylindrical conduit comprising a generally cylindrical one-piece coupler body of resilient rubberlike material having an axis coincident with an axis of said outer cylindrical conduit, an outer wall of said coupler body for positioning inside end portions of said outer cylindrical conduit, gripper ribs extending radially outward from said outer wall for engagement with an inner wall of said outer cylindrical conduit, said gripper ribs extending in a generally circumferential direction around said outer wall for a distance less than the circumference of said outer wall to permit flow of air past said gripper ribs during installation and removal of said coupler body from said outer cylindrical conduit, a plurality of spaced axially extending duct supporting cylindrical chambers in said coupler body for positioning said adjacent sections of said inner ducts, and each of said chambers having a sealing wiper rib extending circumferentially around a surface of each of said chambers for engaging an outer surface of each of said adjacent sections of said inner ducts whereby the space between said adjacent sections of each of said inner ducts is sealed to facilitate use of air pressure to blow rope or tape used to pull cables through said inner ducts.

2. A conduit coupler in accordance with claim 1 wherein said gripper ribs comprise a plurality of sets of said gripper ribs spaced axially and circumferentially of said coupler body on said outer wall at each end of said conduit coupler.

3. A conduit coupler in accordance with claim 2 wherein each of said sets of gripper ribs includes side-by-side ribs with each of said ribs having a sloping side facing the end of said coupler body which is inserted in said outer cylindrical conduit engaged by said gripper ribs.

4. A conduit coupler in accordance with claim 2 wherein each of said sets of said gripping ribs extends circumferentially of said conduit coupler through an arc of at least 120 degrees and the space between the ends of said gripping ribs extends through an arc of not over 60 degrees.

5. A conduit coupler in accordance with claim 2 wherein each of said sets of said gripper ribs extends circumferentially of said conduit coupler through an arc of at least 165 degrees and the space between the ends of said gripping ribs extends through an arc of not over 15 degrees.

6. A conduit coupler in accordance with claim 1 wherein said gripper ribs in engagement with a first one of said adjacent sections of said outer cylindrical conduit extend radially outward from said outer wall a greater distance than said gripper ribs in engagement with a second one of said adjacent sections whereby said coupler body will be held in said first one of said adjacent sections when said first one of said sections is separated from said second one of said adjacent sections.

7. A conduit coupler in accordance with claim 1 wherein said gripper ribs in engagement with a first one of said adjacent sections of said outer cylindrical conduit have a greater circumferential length than the circumferential length of said gripper ribs in engagement with a second one of said adjacent sections whereby said coupler body will be held in said first one of said adjacent sections when said first one of said adjacent sections is separated from said second one of said adjacent sections.

8. A conduit coupler in accordance with claim 1 wherein each of said chambers has an entrance portion with an enlarged diameter extending from an end of said coupler body to said sealing wiper rib and said sealing wiper rib extending radially inward to an inner diameter less than the diameter of said entrance portion and the less than diameter of the remainder of each of said chambers.

9. A conduit coupler in accordance with claim 8 wherein said sealing wiper rib has walls tapering toward a radially inner edge and at least one of said walls being sloped toward said entrance portion at about a ten degree angle to a plane perpendicular to said axis of said coupler body.

10. A conduit coupler in accordance with claim 1 wherein said conduit coupler body is injection molded of a thermoplastic elastomeric in one piece.

11. A conduit coupler in accordance with claim 1 wherein each of said chambers in said coupler body has a center stop rib extending radially inward at a location generally midway between the ends of said coupler body for limiting the movement of said adjacent sections of said inner ducts through said coupler body.

12. A conduit coupler in accordance with claim 1 wherein said coupler body has an external, circumferentially extending, outer stop rib located on said outer wall at a location generally midway between the ends of said coupler body for limiting the movement of said adjacent sections of said outer cylindrical conduit over said outer wall of said coupler body.

13. A conduit coupler in accordance with claim 12, wherein a first end portion of one of said adjacent sections of said outer cylindrical conduit has a diameter greater than the outer diameter of the remainder of said outer cylindrical conduit providing a bell at said first end portion for extending over an inner end portion of an adjacent section of said outer cylindrical conduit.

14. A conduit coupler in accordance with claim 1 wherein said coupler body has cavities disposed between said chambers to reduce the thickness of the material of said coupler body between said chambers.

15. A conduit coupler in accordance with claim 1 wherein said coupler body has four spaced, axially extending, duct supporting chambers at equally spaced positions circumferentially of said coupler body.

16. A conduit coupler in accordance with claim 1 wherein said coupler body has three spaced, axially extending, duct supporting chambers equally spaced around said coupler body.

17. A conduit coupler in accordance with claim 1 including a plurality of spaced-apart, axially extending, antirotation ribs extending outwardly from said outer wall of said coupler body for engagement with said inner wall of said adjacent sections of said outer cylindrical conduit for limiting rotation of each of said adjacent sections relative to other of said adjacent sections and relative to said coupler body.

* * * * *